US008509741B1

United States Patent
Gailloux et al.

(10) Patent No.: US 8,509,741 B1
(45) Date of Patent: Aug. 13, 2013

(54) SYSTEM AND METHOD FOR MOBILE PHONE ACTIVATION

(75) Inventors: Michael A. Gailloux, Overland Park, KS (US); Jason F. Gall, Raymore, MO (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/571,347

(22) Filed: Aug. 10, 2012

Related U.S. Application Data (62) Division of application No. 12/843,886, filed on Jul. 27, 2010, now Pat. No. 8,295,811.

(51) Int. Cl.
  *H04M 1/66* (2006.01)
  *H04M 1/68* (2006.01)
  *H04M 3/16* (2006.01)
  *H04M 3/00* (2006.01)

(52) U.S. Cl.
  USPC .......................... 455/411; 455/418; 455/419

(58) Field of Classification Search
  USPC ......... 235/375, 380, 382; 370/310, 328–330, 370/335, 338, 352, 437, 465, 466, 469; 705/1.1, 705/26, 27, 28, 40; 709/203, 219, 222; 455/405, 406, 408, 41.1, 41.2, 410, 411, 455/414.1, 418, 419, 422.1, 435.1, 550.1
  See application file for complete search history.

(56) References Cited

U.S. PATENT DOCUMENTS

| | | | |
|---|---|---|---|
| 8,204,794 B1 * | 6/2012 | Peng et al. ................... | 705/26.1 |
| 8,295,811 B1 | 10/2012 | Gailloux et al. | |
| 2003/0092435 A1 * | 5/2003 | Boivin .......................... | 455/419 |
| 2005/0107068 A1 | 5/2005 | Smith et al. | |
| 2009/0149175 A1 * | 6/2009 | Lopresti et al. ............... | 455/433 |

OTHER PUBLICATIONS

Office Action—Restriction Requirement dated Mar. 13, 2012 U.S. Appl. No. 12/843,886, filed Jul. 27, 2010.
FAIPP Pre-Interview Communication dated Apr. 24, 2012, U.S. Appl. No. 12/843,886, filed Jul. 27, 2010.
Notice of Allowance dated Jun. 14, 2012 U.S. Appl. No. 12/843,886, filed Jul. 27, 2010.

* cited by examiner

*Primary Examiner* — Marisol Figueroa
*Assistant Examiner* — Erica Navar (57) ABSTRACT

A method of activating a mobile phone is provided. The method comprises scanning a code accessible from an exterior of a package by an electronic scanning device coupled to a first computer, the package containing the mobile phone and retrieving a plurality of information associated with the mobile phone from a data store based on the code, the retrieving performed by one of the first computer and a second computer. The method also comprises transmitting the plurality of information by the provisioning application to a wireless communication network to at least partly provision wireless communication service to the mobile phone, whereby the wireless communication network is triggered to activate the mobile phone, wherein the transmitting is performed by the same computer that retrieved the plurality of information.

15 Claims, 7 Drawing Sheets

SYSTEM AND METHOD FOR MOBILE PHONE ACTIVATION

CROSS-REFERENCE TO RELATED APPLICATIONS

This application is a divisional of and claims priority under 35 U.S.C. §120 to U.S. application Ser. No. 12/843,866, filed Jul. 27, 2010 and entitled "System and Method for Mobile Phone Activation," now U.S. Pat. No. 8,295,811 B1 issued on Oct. 23, 2012 which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones may be purchased at service provider retails stores, electronics retails stores, and/or at general retail stores. A variety of activities may be needed to bring a new mobile phone into service. In some mobile phones, a subscriber identity module (SIM) card may need to be physically installed into the mobile phone. Information associated with the mobile phone may be coupled to a subscriber account of an owner of the mobile phone, in the case that wireless communication service is provided to the mobile phone under a post-paid wireless service account. Other identifying information associated with the mobile phone may be coupled to a phone number of the phone. This information may be stored in one or more data stores in the service provider network and generally may be referred to as provisioning information.

SUMMARY

In an embodiment, a method of activating a mobile phone is disclosed. The method comprises scanning a code accessible from an exterior of a package by an electronic scanning device coupled to a first computer, the package containing the mobile phone and retrieving a plurality of information associated with the mobile phone from a data store based on the code, the retrieving performed by one of the first computer and a second computer. The method also comprises transmitting the plurality of information by the provisioning application to a wireless communication network to at least partly provision wireless communication service to the mobile phone, whereby the wireless communication network is triggered to activate the mobile phone, wherein the transmitting is performed by the same computer that retrieved the plurality of information.

In an embodiment, a method of provisioning a mobile phone is disclosed. The method comprises receiving by a computer an electronic message confirming completion of a sales transaction for the mobile phone from an authenticated point-of-sale device. The method also comprises, in response to the electronic confirmation message, storing in a non-transitory memory provisioning information about the mobile phone based at least in part on the electronic confirmation message. The method also comprises providing a wireless communication link to the mobile phone by a base transceiver station based at least in part on the provisioning information.

In an embodiment, a method of activating a mobile phone is provided. The method comprises storing provisioning information about the mobile phone in a non-transitory storage by a provisioning application executing on a first computer. The method also comprises delaying a first predefined period of time after storing the provisioning information. The method further comprises, after delaying the first predefined period of time, sending a first message by an activation application executing on one of the first computer and a second computer to the mobile phone to complete activation of the mobile phone.

In an embodiment, a method of packaging a portable electronic device for shipment is provided. The method comprises identifying a plurality of information associated with the portable electronic device comprising a subscriber identification module (SIM) card number and one of an electronic serial number (ESN) or an international mobile station equipment identity (IMEI), storing the plurality of information as an entry in a data store referenced by a code, and sealing the portable electronic device in a package, wherein the package has a tag comprising the code that is electronically readable without unsealing the package.

In an embodiment, a system for activating a portable electronic device is provided. The system comprises a scanning device to scan a code accessible from an exterior of a package containing the portable electronic device and a point-of-sale terminal to complete a payment transaction and to send a sales completion message comprising the code to a mobile communication network. The system also comprises a provisioning system to send a provisioning information request comprising the code to the mobile communication network, to receive the provisioning information from the network, to parse the provisioning information into a plurality of separate pieces of information, to format the separate pieces of information in a provisioning command, and to transmit the provisioning command to the network, wherein the provisioning command causes the network to provision the portable electronic device and to transmit activation information to the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure describes a system for and methods of activating mobile phones. In an embodiment, a tag on the exterior of a distribution package containing a mobile phone and optionally containing a subscriber identification module (SIM) card may be scanned by a sales clerk at a point of sale (POS) terminal during a transaction purchasing the subject mobile phone. The information that is scanned, for example a code associated with the distribution package and its contents, is transmitted with a sales transaction completed message to a wireless communication network to be stored in a data store containing various information about the distribution package and the mobile phone that is indexed by, keyed by, referenced by, and/or linked to the subject code. The information about the mobile phone and/or the distribution package may include an electronic serial number (ESN), a SIM card identification number, an international mobile station equipment identity (IMEI), a model identifier, a lock code, and/or other information. In a typical prior art mobile phone purchase transaction at a wireless service provider retail store, this information may be obtained by opening the distribution package, taking the phone out of the package, reading the electronic serial number from a label on the phone, and reading the international mobile station equipment identity from a label on the phone; taking the SIM card out of the package and reading the SIM card identification number from a label on the SIM card; taking a manual or other printed material out of the package and reading the model identifier and the lock code. The method disclosed here, by contrast, obviates opening the distribution package and at least partially unpacking and repacking the contents, thereby streamlining the purchasing transaction.

Having completed the sales transaction, the sales clerk may move to a provisioning station that may be located adjacent to the point of sale terminal. Alternatively, in an embodiment, the point of sale terminal and the provisioning station may be integrated into a single station. The sales clerk may scan the tag on the package again with a scanner coupled to the provisioning station. The code that is scanned is used by the provisioning station to look up the information about the mobile phone and the distribution package from the data store, for example by sending a data store read message containing the code to be used as a key or index to the appropriate entry in the data store. The data store returns the subject information to the provisioning station, and the provisioning station may use the information to at least partly provision a wireless communication service for the mobile phone in the wireless communication network. For example, the electronic serial number, the SIM card identification number, the international mobile station equipment identity, the model number, and/or the lock code may be automatically propagated to input fields of a user interface on the provisioning station. The clerk may provide any needed additional information and then execute a provisioning procedure. The provisioning station may transmit a message containing the provisioning information to the wireless communication network where the appropriate provisioning is completed.

After the mobile phone is provisioned in the wireless communication network, the wireless communication network may complete activation of the mobile phone by pushing information to the mobile phone, for example a phone number to be associated with the mobile phone. In an embodiment, a first predefined delay may be observed after the provisioning is completed before a first activation message is sent to the mobile phone. If the mobile phone does not respond to the first activation message, a second predefined delay may be observed after the first activation message was sent before a second activation message is sent to the mobile phone. If the mobile phone does not respond to the second activation message, a third predefined delay may be observed after the second activation message was sent before a third activation message is sent to the mobile phone. In an embodiment, the second predefined delay may be longer than the first predefined delay, and the third predefined delay may be longer than the second predefined delay. In an embodiment, the first predefined delay may be an hour, but in other embodiments a different first predefined delay may be implemented. The predefined delay may be determined based on an estimate of how long it takes an average customer to drive home from the store with the distribution package, to open the package, to unpack the mobile phone, to install the mobile phone battery, optionally to install the SIM card, and optionally to charge the battery sufficiently for the phone to wirelessly notify its presence to the wireless communication network. If the mobile phone does not respond to any of the activation messages, the user of the mobile phone may need to complete the activation process manually. In an embodiment, the provisioning station may manage the observance of the predefined delays and the completion of the activation process. Alternatively, after completing the provisioning steps, the provisioning station may hand-off to the wireless communication network, and the wireless communication network may manage the observance of the predefined delays and the completion of the activation process.

Figure 1:
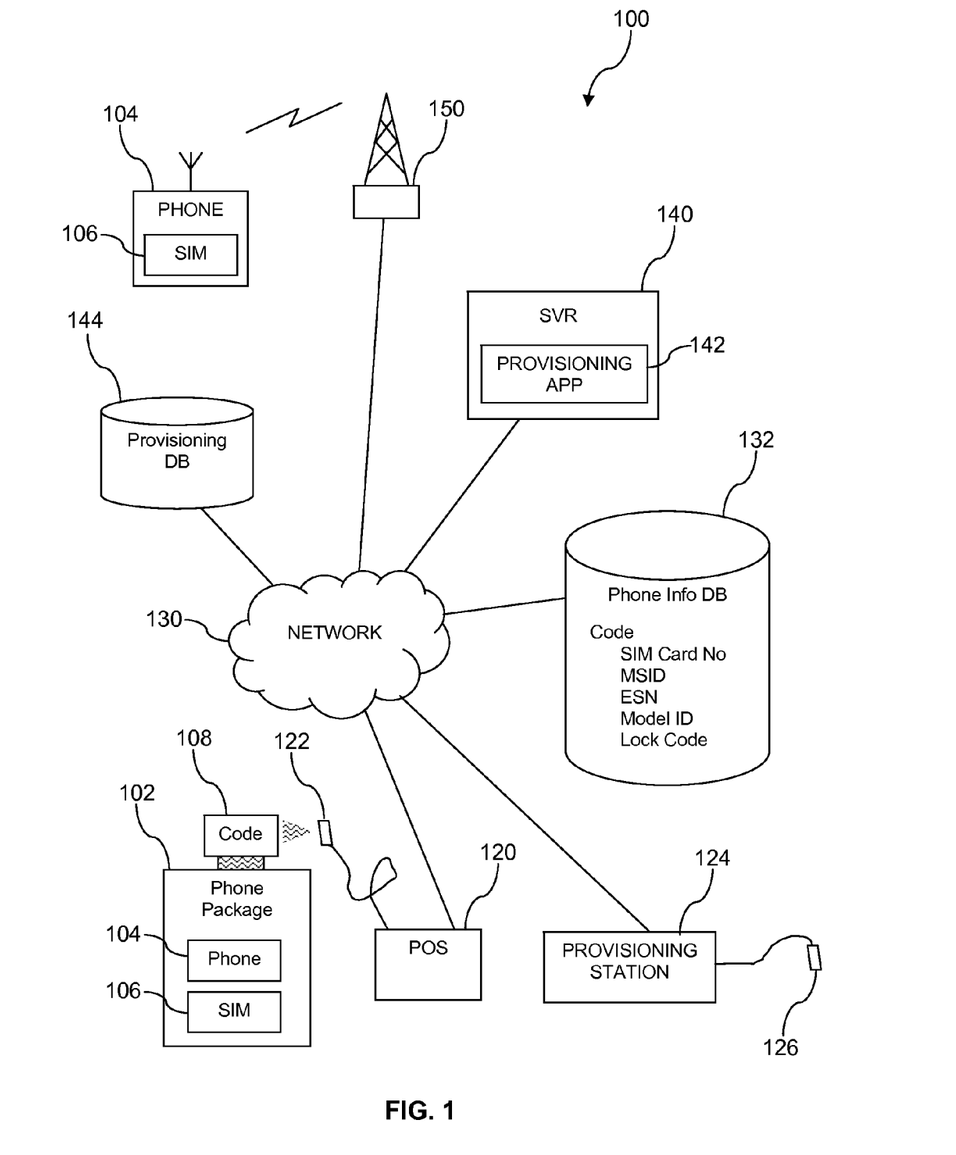
FIG. 1 is an illustration of a system according to an embodiment of the disclosure.

Turning now to FIG. 1, a system 100 is described. The system 100 comprises a mobile phone distribution package 102 that contains a mobile phone 104 and optionally a subscriber identification module (SIM) card 106. A mobile phone is discussed in more detail later. A code 108 is associated with the package 102 and is readable by a first scanner 122. The code 108 may be on the inside or on the outside of the package 102. The code 108 may be a radio frequency identity (RFID) tag that can be read by a radio receiver whether the RFID tag is on the inside or on the outside of the package 102. Alternatively, the code 108 may be an optical code such as a bar code or a two dimensional bar code such as a Semacode, ShotCode, and/or QR code.

The first scanner 122 is coupled to a point of sale terminal 120. A provisioning station 124 is coupled to a second scanner 126 that is likewise operable to scan and/or read the code 108. In an embodiment, the point of sale terminal 120 and the provisioning station 124 may be integrated into a single system, for example a single system executing a point of sale application and a provisioning application, and the first scanner 122 may be used by both the point of sale application and the provisioning application, therefore obviating the second scanner 126. The point of sale terminal 120 and the provisioning station 124 may each be implemented as a computer system. Likewise, the single system integrating the point of sale terminal 120 and the provisioning station 124 may be implemented as a computer system. Computer systems are discussed in detail hereinafter. Each of the point of sale terminal 120 and the provisioning station 124 are coupled to a network 130. When a single system executes the point of sale application and the provisioning application, the single system is coupled to the network 130. The network 130 may comprise any combination of public and private networks. Part of the network 130 may comprise the Internet. The package 102, the code 108, the first scanner 122, the point of sale terminal 120, the provisioning station 124, and the second scanner 126 may be considered to be located in a discount retail store or other retail location.

The system 100 further comprises a data store 132 comprising mobile phone information stored as a plurality of entries, with each entry indexed, referenced, or keyed based on the code 108. While a single entry for mobile phone information is illustrated in the data store 132 in FIG. 1, it is understood that the data store 132 may contain any number of entries of mobile phone information keyed to code 108. A provisioning data store 144 contains provisioning data that may be used by a wireless communication network to provide wireless communication service to the subject mobile phone 104. The wireless communication network may comprise a plurality of base transceiver stations, including the base transceiver station 150, for providing wireless links to mobile phone 104. Additionally, the wireless communication network may comprise a variety of communication nodes that conceptually may be considered to form a part of the network 130. These communication nodes may comprise media gateways, signaling gateways, routers, server computers, and other devices. In an embodiment, a server 140 executing a provisioning application 142 interacts with the provisioning station 124 to provision wireless communication service for the mobile phone 104, for example by entering provisioning data into the provisioning data store 144. In an embodiment, a provisioning application executing on the provisioning station 124 may be viewed as a client and the provisioning application 142 may be viewed as a provisioning server. The server 140 may be implemented as a computer system. While the provisioning data store 144 is illustrated as a single entity, it is understood that provisioning information associated with the mobile phone 104 may be distributed to a plurality of separate physical entities in a wireless communication network. For example, some provisioning information associated with the mobile phone 104 may be maintained in a home location register (HLR) data store, provisioning information related to billing for the mobile phone 104 may be maintained in a billing data store, and provisioning information identifying services subscribed to by the mobile phone 104 may be maintained in yet another data store entity.

When brought into service, the mobile phone 104 optionally has the SIM card 106 installed inside of the mobile phone 104 and communicates with a base transceiver station 150. As is known to those of skill in the art, some mobile phones have a SIM card installed while other mobile phones do not use SIM cards. Mobile phones that communicate according to the global system for mobile communications (GSM) wireless communication protocol and according to the long-term evolution (LTE) wireless communication protocol use SIM cards. On the other hand, mobile phones that communicate according to the code division multiple access (CDMA) wireless communication protocol and according to the worldwide interoperability for microwave access (WiMAX) wireless communication protocol do not use SIM cards. When the mobile phone 104 is first brought into service, the wireless communication network may push activation information to the mobile phone 104 via the base transceiver station 150.

When a customer selects the mobile phone 104 for purchase and approaches the payment counter with the package 102, a clerk operating the point of sale terminal 120 may use the first scanner 122 to scan the code 108. The clerk completes a sales transaction for the package 102 at the point of sale terminal 120, for example receiving payment. On the completion of the sales transaction, the point of sale terminal 120 may send a sales transaction message to the wireless communication network including the code 108. This information may be stored in the first data store 132 or at some other point in the wireless communication network. The sales transaction information may be used later to authorize further provisioning associated with the mobile phone 104. For example, if an attempt is made to provision or otherwise bring into service the mobile phone 104 before a sales transaction has been posted to the first data store 132 or other storage in the wireless communication network, the provisioning attempt may be rejected to avoid provisioning a mobile phone that may have been stolen.

After the clerk has completed the sales transaction using the point of sale terminal 120, the clerk may move to the provisioning station 124 to initiate provisioning of the mobile phone 104. While in the description that follows the point of sale terminal 120 and the provisioning station 124 are treated as separate systems, it is understood that in an embodiment the point of sale terminal 120 may be integrated with the provisioning station 124 in a single system. Likewise, while in the descriptions here the first scanner 122 and the second scanner 126 are separate devices, in an integrated system one scanner, for example the first scanner 122, may be employed to scan the code for both the purchase transaction and for the provisioning.

At the provisioning station 124, the clerk scans the code 108 using the second scanner 126. The provisioning station 124 uses the scanned code to look up provisioning information about the mobile phone 104 in the first data store 132. For example, the provisioning station 124 scans the code 108 and sends a message requesting the information in the entry of the first data store 132 keyed and/or indexed by the code 108. The message contains the code 108. The first data store 132 looks up the entry referenced or keyed by the code 108 and returns this to the provisioning station 124. The provisioning station 124 may first confirm that a sales transaction has been completed for the subject mobile phone 104. If no sales transaction has been recorded in the first data store 132 for the entry referenced by the code 108, the provisioning operation may be terminated. Assuming the phone has in fact already been sold, for example, possibly by the same clerk attempting to provision the mobile phone 104, some corrective action may be needed on the part of the clerk.

If the sales transaction confirms, the information returned by the first data store 132 may be used to continue with provisioning of the mobile phone 104. This information may comprise the electronic serial number, an optional SIM card identification number, an international mobile station equipment identity, a model identifier, a lock code, and/or other information. This information may be populated into provisioning fields of a provisioning user interface of the provisioning station 124. In an embodiment, a mediator application may be provided to populate the information into a legacy provisioning application executing on the provisioning station 124. If needed, the clerk may request the purchaser of the mobile phone 104 to provide additional information to be provisioned, for example a mobile phone number, desired wireless services, or other information. The clerk causes the provisioning station 124 to transmit the provisioning information to the provisioning data store 144 and/or to other entities in the wireless communication network as discussed above.

To complete provisioning of the mobile phone 104, the wireless communication network may push activation information to the mobile phone 104 via a wireless link provided by the base transceiver station 150. When the purchaser of the phone leaves the sales counter where the point of sale terminal 120 and the provisioning station 124 are located, however, the mobile phone 104 may remain inside the package 102, the battery may not be installed into the mobile phone 104 and/or may not yet be charged, and the optional SIM card may not be installed into the mobile phone 104. To allow the phone purchaser time to assemble the mobile phone 104, the provisioning station 124 may initiate a first count-down timer or other process or thread to introduce a first predefined time delay before the wireless communication network attempts to push the activation information to the mobile phone 104 via the wireless link. The first predefined time delay may be selected based on statistical information about how long it takes for the purchaser to drive home from the retail location, how long it takes for the purchaser to remove the mobile phone 104 from the package 102 and to assemble the mobile phone 104, for example possibly installing the optional SIM card 106 into the mobile phone 104, installing the battery into the mobile phone 104, and/or how long it takes to sufficiently charge the battery to wirelessly notify the base transceiver station 150 that the mobile phone 104 is present. In an embodiment, the first predefined time delay may be about one hour, about two hours, about five hours, or some other predefined time delay effective to permit purchasers to put the mobile phone 104 on a battery charger.

If the mobile phone 104 does not respond to the first attempt to push activation information to the mobile phone 104 over the wireless link from the base transceiver station 150, the provisioning station 124 may initiate a second count-down timer to introduce a second predefined time delay before the wireless communication network again attempts to push the activation information to the mobile phone 104 via the wireless link. If the mobile phone 104 does not respond to the second attempt to push activation information to the mobile phone 104 over the wireless link from the base transceiver station 150, the provisioning station 124 may initiate a third count-down timer to introduce a third predefined time delay before the wireless communication network again attempts to push the activation information to the mobile phone 104 via the wireless link. In an embodiment, the second predefined time delay may be longer than the first predefined time delay, and the third predefined time delay may be longer than the second predefined time delay. If the mobile phone 104 fails to respond after a predetermined number of activation attempts, for example after three attempts, the wireless communication network may stop repeating activation push attempts, and the purchaser of the mobile phone 104 may complete the activation through an alternative activation procedure. In an embodiment, rather than the provisioning station 124 managing the count-down timers, after the initial provisioning is completed by the provisioning station 124, the wireless communication network may manage the count-down timers and initiating the activation attempts. The system 100 and purchase method and provisioning method described above may streamline the purchase and provisioning process for mass retailers who may not wish to burden their service personnel in lengthy purchase transactions or invest in substantial technical training for their service personnel to enable them to complete complex provisioning operations.

To support the system and method of provisioning and activating the mobile phone 104 described above, a distribution center may follow a novel procedure of order fulfillment associated with the mobile phone 104 and the package 102. A distribution center employee creates an entry in the first data store 132 referenced by or keyed by the code 108 and the entry is populated with information. The code 108 may then be associated with the package 102 by the distribution center employee, for example by adhering a tag containing the code 108 to the outside or inside of the package 102. The tag may be a one-dimensional bar code such as a universal product code (UPC) or a two-dimensional bar code such as a Sema-Code or a Shot Code. The tag may be a radio frequency identity (RFID) tag.

A distribution center employee may identify the plurality of information associated with the mobile phone 104 and/or the package 102 by reading information off a label on the exterior or interior of the mobile phone 104, by reading information off a label on the optional SIM card 106, by reading information off of printed material such as a user manual or other information. The information may comprise one or more of number of the SIM card 106, a mobile subscriber identity number (MSID), an electronic serial number (ESN), an international mobile station equipment identity (IMEI), a model identifier, and a lock code. The information may comprise an identity of an initial top-up card or initial balance in a pre-paid account. In an embodiment, identifying the plurality of information associated with the portable electronic device comprises scanning a subscriber identification module (SIM) card number associated with the portable electronic device by an electronic scanning device and scanning by the electronic scanning device one of an electronic serial number (ESN) associated with the portable electronic device and an international mobile station equipment identity (IMEI) associated with the portable electronic device.

After identifying the information, the distribution center employee may enter the subject information into an automated user interface to populate into the subject data entry referenced by the code 108 in the first data base 132. The mobile phone 104, the optional SIM card 106, a battery, any relevant printed material may then be added to the package 102, and the package 102 may then be sealed. One skilled in the art will readily appreciate that the order of some of the steps described above may be changed. Additionally, one skilled in the art will readily appreciate that the steps described above as performed by one employee may be performed by multiple employees and possibly at multiple different order fulfillment stations. Additionally, the steps may be performed by other than a distribution center employee. In an embodiment, one or more of the steps may be performed by an employee of the manufacturer of the mobile phone 104. For example, in an embodiment, the distribution center may provide specifications, identification numbers, and other information to the manufacturer of the mobile phone 104 needed to perform at least some of the steps.

Figure 2:
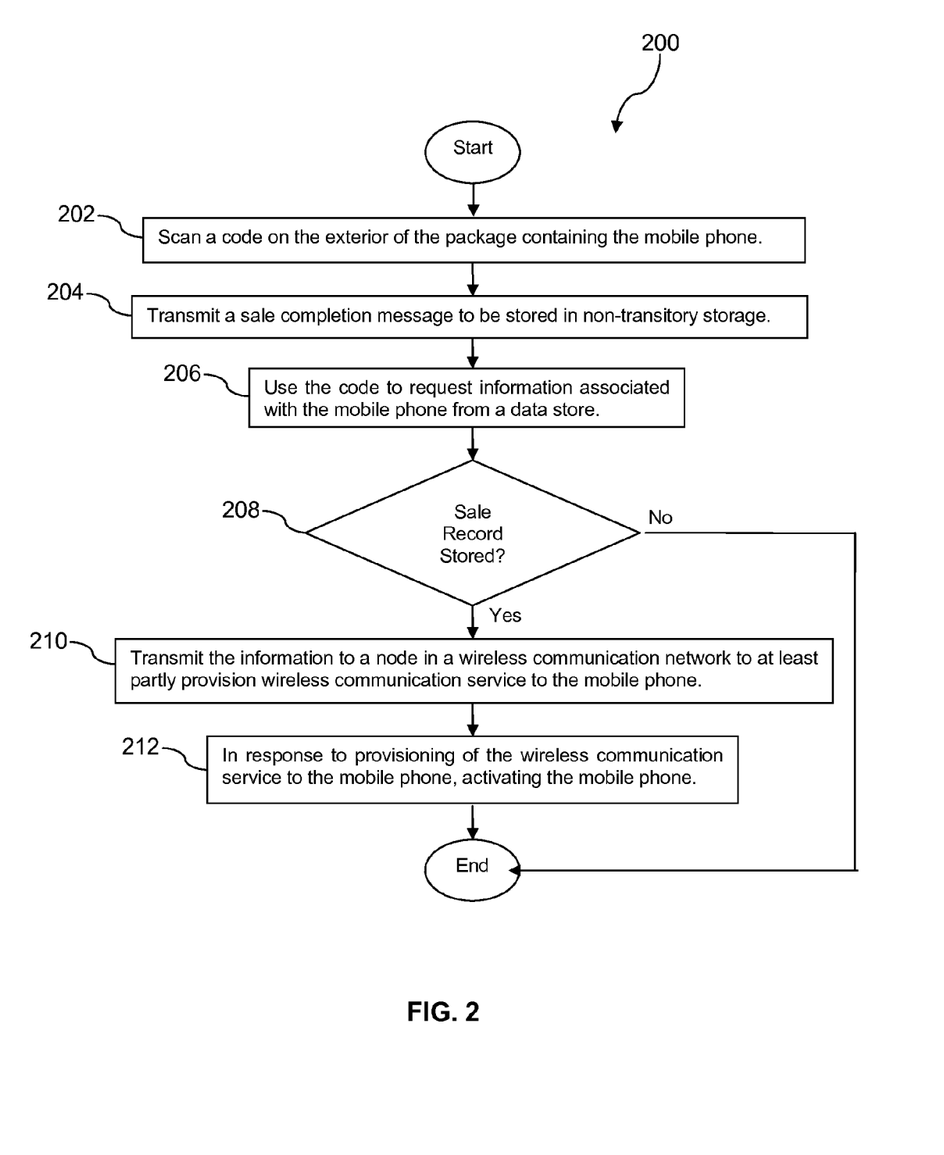
FIG. 2 is a flow chart of a method according to an embodiment of the disclosure.

Turning now to FIG. 2, a method 200 is discussed. At block 202, the code 108 is scanned. In an embodiment, the code 108 is located on the exterior of the package 102 and may take the form of a bar code or a two dimensional bar code. Alternatively, the code 108 may be contained by a radio frequency identity (RFID) tag that may be located on the exterior or on the interior of the package 102. At block 204, a sale completion message is transmitted to be stored in a non-transitory storage and/or non-transitory memory. For example, a purchaser provides a cash payment, a credit card payment, and/or a debit card payment at the point of sale terminal 120 to pay for the mobile phone 104, and the point of sale terminal 120 transmits a sale completion message including the code 108 to the first data store 132.

At block 206, the code 108 is used to request information associated with the mobile phone 104 from the first data store 132. For example, the code 108 is scanned by the second scanner coupled to the provisioning station 124. At block 208, the information obtained from the first data store 132 based on the code 108 is parsed and/or analyzed to determine if a completed sales transaction is stored for the subject mobile phone 104. If no sales transaction has been completed for the mobile phone 104, the method 200 exits without completing provisioning of wireless communication service to the mobile phone 104. If a completed sales transaction is stored, the method 200 proceeds to block 210.

At block 210, at least some of the information retrieved from the first data store 132 based on the code 108 is transmitted to a node in a wireless communication network to at least partially provision wireless communication service to the mobile phone 104. For example, provisioning information is transmitted from the provisioning station 124 to the provisioning data store 144 and/or to a plurality of nodes in the wireless communication network. At block 212, after the provisioning step of block 210 has been completed, the mobile phone 104 is activated. This step may comprise pushing information from the wireless communication network to the mobile phone 104 via a wireless link, for example from the base transceiver station 150 to the mobile phone 104. The activation information may comprise a phone number of the mobile phone 104 and/or other information. In an embodiment, a predefined time delay may be observed between the completion of block 210 and the first attempt to push activation information to the mobile phone 104 in block 212.

Figure 3:
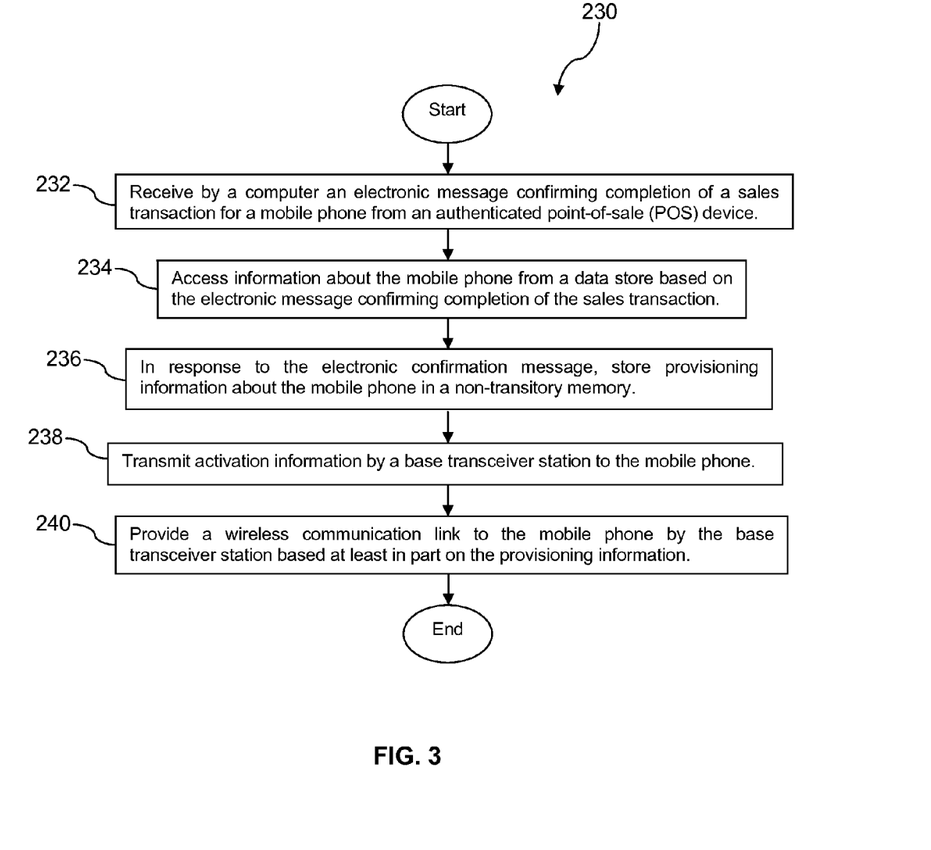
FIG. 3 is a flow chart of a method according to an embodiment of the disclosure.

Turning now to FIG. 3, a method 230 is described. At block 232, a computer receives an electronic message confirming completion of a sales transaction for a mobile phone from an authenticated point-of-sale device. For example, a computer mediating read/write access to the first data store 132 receives a sales transaction message for the mobile phone 104 from the point of sale terminal 120. The sales transaction message may contain authentication tokens that enable the computer to validate the sales transaction message and reject unauthorized sales transaction messages.

At block 234, information about the mobile phone is accessed from a data store based on the electronic message confirming completion of the sales transaction. For example, information is accessed based on the code 108 that may be included in the electronic message. The accessed information may comprise an electronic serial number, a SIM card identification number, an international mobile station equipment identity, a model identifier, a lock code, and/or other information.

At block 236, in response to the electronic confirmation message, provisioning information about the mobile phone is stored in a non-transitory memory. For example, the information about the mobile phone 104 is transmitted to the provisioning station 124, and the provisioning station 124 in response transmits the information to the provisioning data store 144 and/or to other non-volatile storage in a wireless communication network.

At block 238, activation information is transmitted by a base transceiver station to the mobile phone, for example from the base transceiver station 150 to the mobile phone 104. At block 240, a wireless communication link is provided to the mobile phone by the base transceiver station based at least in part on the provisioning information.

Figure 4:
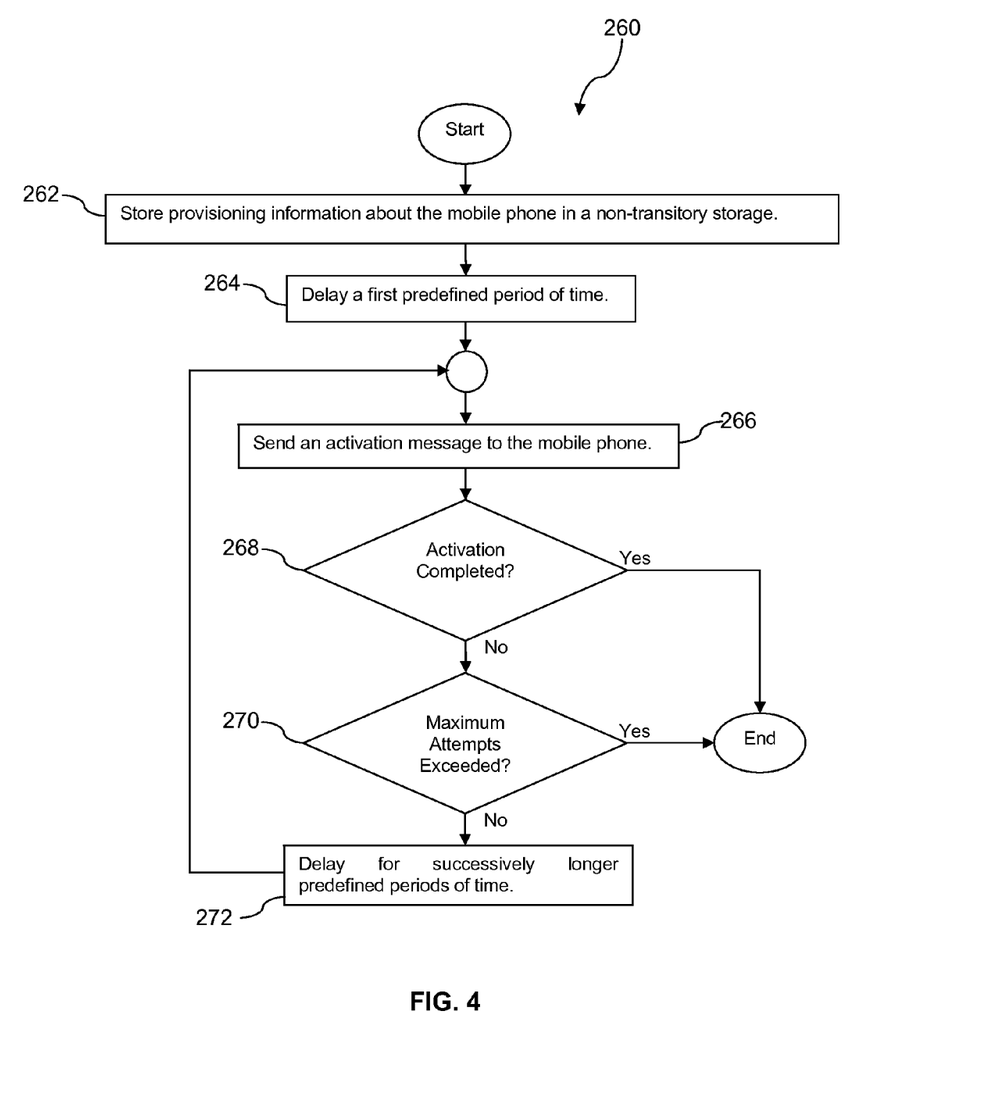
FIG. 4 is a flow chart of a method according to an embodiment of the disclosure.

Turning now to FIG. 4, a method 260 is described. At block 262, provisioning information about the mobile phone 104 is stored in a non-transitory storage, for example in the provisioning data store 144 and/or in other nodes in the wireless communication network as described further above. At block 264, the method 260 delays for a first predefined period of time. The predefined period of time may be determined by one skilled in the art, possibly on the basis of statistical data and/or user poll data, based on an estimate of how long it takes a purchaser of the mobile phone to assemble the phone and to sufficiently charge its battery to establish a wireless link from the base transceiver station 150 to the mobile phone 104. In an embodiment, the first predefined period of time may be in the range from about 5 minutes to about 20 minutes. The first predefined period of time may be determined so as to provide for the case of a purchaser who opens the mobile phone package and powers up in the retail store or in the parking lot of the retail store.

At block 266, an activation message is sent to the mobile phone. For example, an activation message is transmitted from the base transceiver station 150 to the mobile phone 104. At block 268, if the activation is completed, the method 260 exits. The activation may be deemed completed when the mobile phone 104 returns an activation complete message or based on some other returned message. At block 268, if the activation is not completed, the method 260 proceeds to block 270. At block 270, if the maximum number of attempts has been equaled, the method 260 exits. In an embodiment, the maximum number of attempts may be three attempts. Alternatively, in another embodiment, a different maximum number of attempts may be defined. At block 270, if the maximum number of attempts has not been equaled, the method 260 proceeds to block 272. At block 272, the method 260 delays for a predefined period of time. In an embodiment, each successive iteration of the loop 266, 268, 270, 272 results in an increased predefined period of time delay. After the predefined delay, the method returns to block 266 where the activation message is again sent to the mobile phone 104. In an embodiment, a second predefined delay (the first predefined delay is that associated with block 264) may be determined to accommodate a purchaser driving home and placing their new phone on the charger for a period of time, for example about an hour or about 2 hours. A third predefined delay may be determined to accommodate devices that were missed by the first and second predefined delays.

Figure 5:
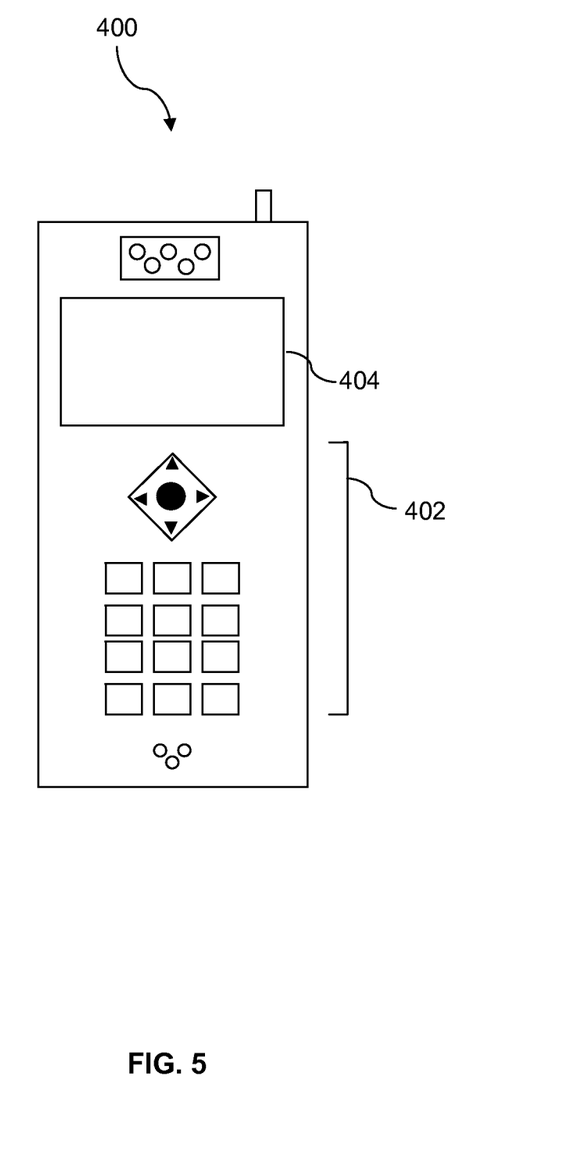
FIG. 5 is an illustration of a handset according to an embodiment of the disclosure.

FIG. 5 illustrates a mobile phone 400 having a keypad and/or touchscreen input 402 and a display 404. The mobile phone 400 may be substantially similar to the mobile phone 104 described above. The mobile phone 400 may present options for the user to select, controls for the user to actuate, and/or cursors or other indicators for the user to direct. The mobile phone 400 may further accept data entry from the user, including numbers to dial or various parameter values for configuring the operation of the handset. The mobile phone 400 may further execute one or more software or firmware applications in response to user commands. These applications may configure the mobile phone 400 to perform various customized functions in response to user interaction. Additionally, the mobile phone 400 may be programmed and/or configured over-the-air, for example from a wireless base station, a wireless access point, or a peer mobile phone 400. The mobile phone 400 may execute a web browser application which enables the display 404 to show a web page.

Figure 6:
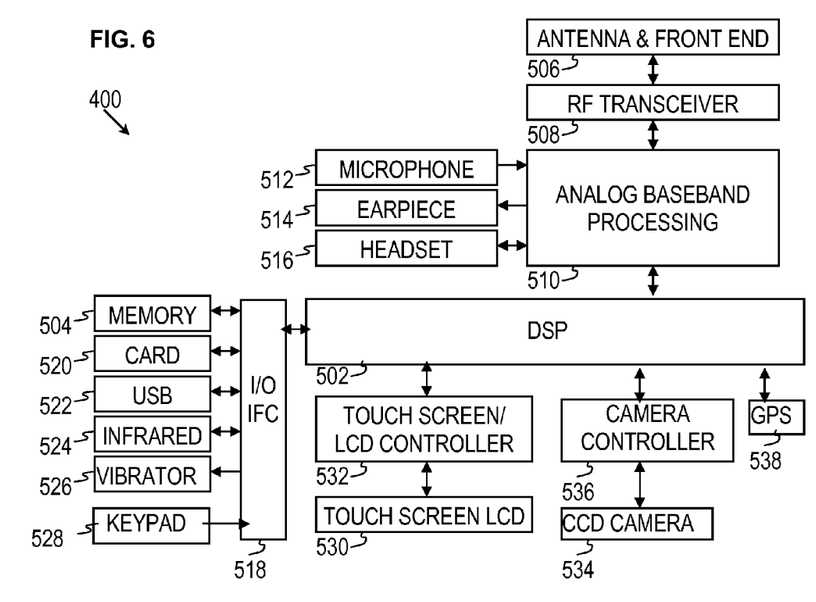
FIG. 6 is a block diagram of a handset according to an embodiment of the disclosure.

FIG. 6 shows a block diagram of the mobile phone 400. While a variety of known components of handsets 400 are depicted, in an embodiment a subset of the listed components and/or additional components not listed may be included in the mobile phone 400. The mobile phone 400 includes a digital signal processor (DSP) 502 and a memory 504. As shown, the mobile phone 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile phone 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile phone 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile phone 400 to send and receive information from a radio access network (RAN) or some other available wireless communications network or from a peer mobile phone 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile phone 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile phone 400 to function as a peripheral device to exchange information with a personal computer or other computer system. The infrared port 524 and other optional ports such as a Bluetooth interface or an IEEE 802.11 compliant wireless interface may enable the mobile phone 400 to communicate wirelessly with other nearby handsets and/or wireless base stations.

The input/output interface 518 may further connect the DSP 502 to the vibrator 526 that, when triggered, causes the mobile phone 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile phone 400. Another input mechanism may be the touch screen LCD 530, which may also display text and/or graphics to the user. The touch screen LCD controller 532 couples the DSP 502 to the touch screen LCD 530.

The CCD camera 534 enables the mobile phone 400 to take digital pictures. The DSP 502 communicates with the CCD camera 534 via the camera controller 536. The GPS sensor 538 is coupled to the DSP 502 to decode global positioning system signals, thereby enabling the mobile phone 400 to determine its position. In another embodiment, a camera operating according to a technology other than charge coupled device cameras may be employed. Various other peripherals may also be included to provide additional functions, e.g., radio and television reception.

Figure 7:
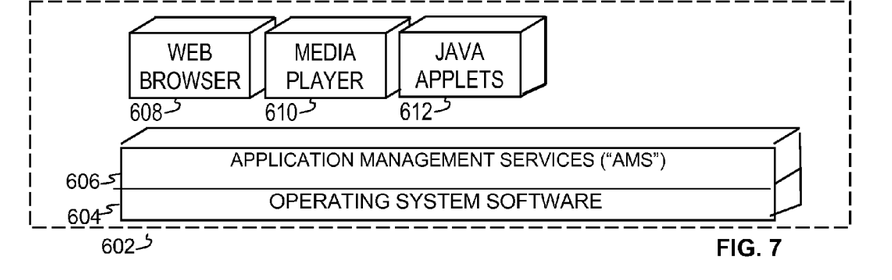
FIG. 7 is a block diagram of a software architecture of a handset according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile phone 400. Also shown in FIG. 7 are a web browser application 608, a media player application 610, and JAVA applets 612. The web browser application 608 configures the mobile phone 400 to operate as a web browser, allowing a user to enter information into forms and select links to retrieve and view web pages. The media player application 610 configures the mobile phone 400 to retrieve and play audio or audiovisual media. The JAVA applets 612 configure the mobile phone 400 to provide games, utilities, and other functionality.

Figure 8:
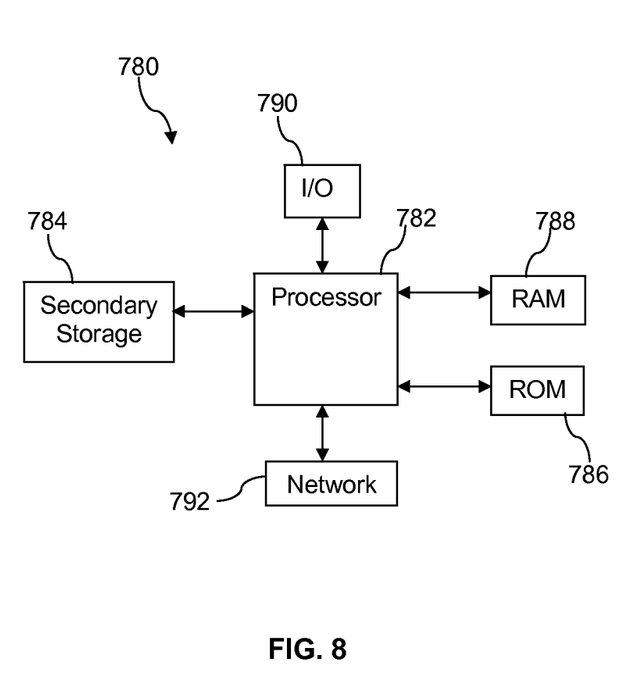
FIG. 8 is an illustration of an exemplary computer system suitable for implementing some aspects of the several embodiments of the disclosure.

FIG. 8 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, or other, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning a mobile phone, comprising:
   receiving, by a first computer, an electronic message confirming completion of a sales transaction for the mobile phone from an authenticated point-of-sale device;
   in response to the electronic confirmation message, storing in a non-transitory memory provisioning information about the mobile phone based at least in part on the electronic confirmation message;
   providing a wireless communication link to the mobile phone by a base transceiver station based at least in part on the provisioning information;
   delaying a first predefined period of time after storing the provisioning information; and
   after delaying the first predefined period of time, sending, by an activation application executing on a second computer, a first message to the mobile phone to complete activation of the mobile phone.

2. The method of claim 1, further comprising transmitting activation information by the base transceiver station to the mobile phone after storing the provisioning information about the mobile phone in the non-transitory memory.

3. The method of claim 2, wherein the activation information comprises a phone number.

4. The method of claim 1, wherein the electronic confirmation message comprises a code scanned from an exterior of a package containing the mobile phone, and further comprising accessing information about the mobile phone from a data store by a third computer based on the scanned code, and wherein at least some of the provisioning information is based on the information accessed from the data store.

5. The method of claim 4, wherein the information accessed from the data store comprises at least one of a mobile subscriber identity number (MSID), an electronic serial number (ESN), a subscriber identification module (SIM) card number, an international mobile station equipment identity (IMEI), a model identifier, or a lock code.

6. The method of claim 1, wherein the first predefined period of time is at least fifteen minutes.

7. The method of claim 1, further comprising, when the first message is not acknowledged by the mobile phone and after delaying a second predefined period of time after sending the first message, sending, by the activation application, a second message to complete activation of the mobile phone, wherein the second predefined period of time is longer than the first predefined period of time.

8. The method of claim 7, further comprising, when the second message is not acknowledged by the mobile phone and after delaying a third predefined period of time after sending the second message, sending, by the activation application, a third message to complete activation of the mobile phone, wherein the third predefined period of time is longer than the second predefined period of time.

9. The method of claim 1, wherein the activation of the mobile phone comprises the mobile phone sending a reply message containing a phone number of the mobile phone back to the activation application.

10. The method of claim 1, further comprising:
   identifying a plurality of information associated with the mobile phone comprising a subscriber identification module (SIM) card number and one of an electronic serial number (ESN) or an international mobile station equipment identity (IMEI);
   storing the plurality of information as an entry in a data store referenced by a code; and
   sealing the mobile phone in a package, wherein the package has a tag comprising the code that is electronically readable without unsealing the package.

11. The method of claim 10, wherein the plurality of information further comprises at least one of a mobile subscriber identity number (MSID), a model identifier, or a lock code.

12. The method of claim 10, wherein identifying the plurality of information associated with the mobile phone comprises:
   scanning, by an electronic scanning device, a subscriber identification module (SIM) card number associated with the mobile phone; and
   scanning, by the electronic scanning device, one of an electronic serial number (ESN) associated with the mobile phone or an international mobile station equipment identity (IMEI) associated with the mobile phone.

13. The method of claim 12, wherein identifying the plurality of information associated with the mobile phone further comprises entering a model identifier using a computer.

14. The method of claim 1, wherein the first computer and the second computer are one of the same or different.

15. The method of claim 4, wherein the first computer, the second computer, and the third computer are one of the same or different.

* * * * *